United States Patent
Harrison

[19]

[11] Patent Number: 5,956,893
[45] Date of Patent: Sep. 28, 1999

[54] PLANT IRRIGATION TABLE

[76] Inventor: Patricia Jessica Harrison, 620 Renaissance Pointe #111, Altamonte Springs, Fla. 32714

[21] Appl. No.: 09/231,947

[22] Filed: Jan. 15, 1999

[51] Int. Cl.[6] .................................................. A01G 31/00
[52] U.S. Cl. .................................... 47/39; 47/48.5; 47/79
[58] Field of Search ............................... 47/39, 79, 62 R, 47/48.5, 82, 81, 80, 18, 59

[56] References Cited

U.S. PATENT DOCUMENTS

| | | | |
|---|---|---|---|
| 3,085,364 | 4/1963 | Chapin | 47/1 |
| 3,108,400 | 10/1963 | Wolfe, Jr. | 47/18 |
| 3,108,401 | 10/1963 | Richardson | 47/39 |
| 3,686,792 | 8/1972 | Barfield | 47/39 |
| 3,912,165 | 10/1975 | Pira | 47/48.5 |
| 4,006,559 | 2/1977 | Carlyon, Jr. | 47/39 |
| 4,194,691 | 3/1980 | Birnbach et al. | 47/80 |
| 4,211,037 | 7/1980 | Green | 47/80 |
| 4,255,896 | 3/1981 | Carl | 47/62 |
| 4,447,983 | 5/1984 | Shinada | 47/48.5 |
| 4,603,506 | 8/1986 | Powell, Jr. | 47/62 |
| 5,220,745 | 6/1993 | Elliott et al. | 47/79 |
| 5,272,835 | 12/1993 | Stern | 47/79 |
| 5,357,710 | 10/1994 | Dulik et al. | 47/48.5 |
| 5,598,662 | 2/1997 | Droste | 47/39 |

FOREIGN PATENT DOCUMENTS 4028802  9/1990  Germany .

*Primary Examiner*—Thomas Price
*Attorney, Agent, or Firm*—Edward M. Livingston, Esq.

[57] ABSTRACT

A plant irrigation table (1) has tubular legs (3) and a tubular frame (4, 5) with rigid tubes (6) having water conveyance from a flow controller (8) to at least one and preferably to a plurality of irrigation hoses for (11) fluid communication from the rigid tubes to one or a plurality of plant pots (12) on at least one surface of the table and on one or more optional rack-table surfaces (24) extended from the rigid tubes. The flow controller can have select levels of timed intermittence and/or levels of controlled steady flow of water with optional fertilizer. Controllable-flow drippers (14) on pot ends of the irrigation tubes control flow to separate plant pots within ranges of flow from the flow controller.

20 Claims, 2 Drawing Sheets

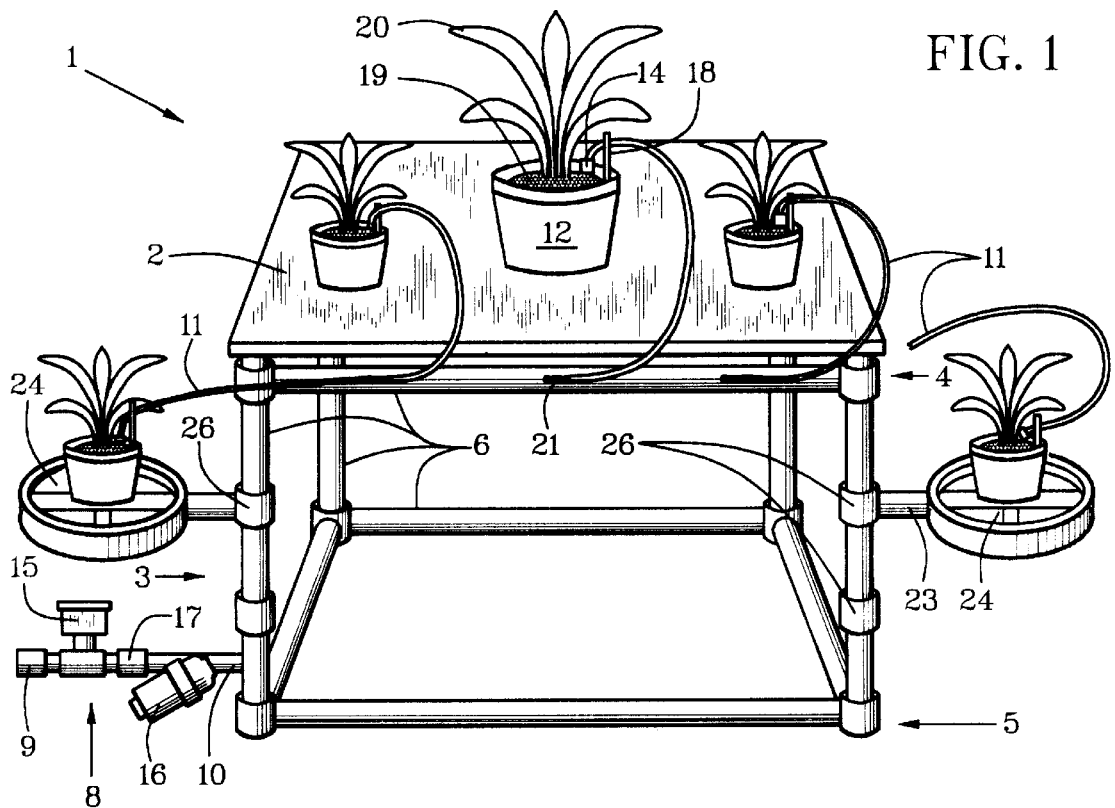
FIG. 1
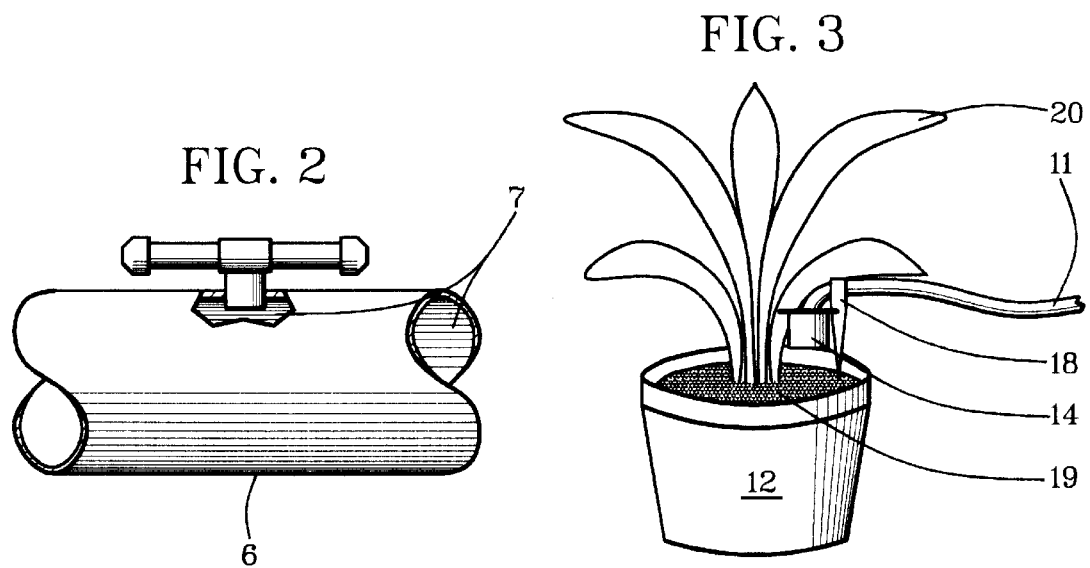
FIG. 2
FIG. 3

PLANT IRRIGATION TABLE

BACKGROUND OF THE INVENTION

This invention relates to potted-plant-irrigator tables with tubular legs having water conveyance with controlled flow for conveying water and optionally fertilizer from conveyance in the tubular legs to plants on one or more table surfaces and/or on optional plant-holder extensions for drip irrigation and other controlled-flow irrigation and fertilization.

A wide selection of plant tables, benches and racks are known, but not with structural and controlled-irrigation capability and adaptability made possible by tubular legs, flow controllers and attachments in a manner taught by this invention.

Examples of different but related potted-plant holders and irrigators are described in the following patent documents. U.S. Pat. No. 5,272,835, issued to Stern on Dec. 28, 1993, described a self-watering pot with double walls for conveying water from a spigot to water outlets positioned circumferentially inside a top of the pot. U.S. Pat. No. 5,220,745, issued to Elliott, et al. on Jun. 22, 1993, described a drip-irrigation pot having a single wall and a single tube from a water spigot to a single irrigation dripper inside of a top portion of the pot. German Patent DE 40 28 802 Al, issued to Richter Sep. 11, 1990, described an automatic watering device for flower pots having a duct with water outlets in a plurality of flower pots on a bench. U.S. Pat. No. 4,211,037, issued to Green on Jul. 8, 1980, described a method and apparatus for irrigating plants in containers having porous bottoms positioned on tops of wetted surfaces. U.S. Pat. No. 3,686,792, issued to Barfield on Aug. 29, 1972, was limited to pots supported in the same level and having bottom-end holes to which feeder lines are extended from a main distribution line. U.S. Pat. No. 3,108,401, issued to Richardson on Oct. 29, 1963, was limited to a plant display rack with central support about which mounting means were positioned. U.S. Pat. No. 3,108,400, issued to Wolfe, Jr. on Oct. 29, 1963, was limited to an elongated bench supporting a plurality of plant receptacles and having a rectilinear main water conduit extended longitudinally with the bench instead of having water-filled legs with irrigation controls and other features taught by this invention. U.S. Pat. No. 3,085,364, issued to Chapin on Apr. 16, 1963, was limited to features similar to the above Wolfe, Jr. patent with a central water tube on a greenhouse bench with outlets to separate potted plants on the bench.

SUMMARY OF THE INVENTION

Objects of patentable novelty and utility taught by this invention are to provide a plant-irrigation table which:

Can be structured for assembly in selectively different forms for different sizes, shapes and decor of rooms or areas in which it is to be used;

Conveys water within table legs to obscure tubing from sight for aesthetic objectives;

Prevents obstruction to walking and avoids being tripped by tubes while moving about in proximity to the tables; and Has timed flow of water and optionally fertilizer to a plurality of plant pots and selectively controllable levels of intermittent flow of the water and optionally fertilizer to separate plant pots in accordance with needs for effective drip irrigation and fertilization of desired plant growth in the plant pots.

This invention accomplishes these and other objectives with a potted-plant-irrigator table that is structured selectively with tubular legs having water conveyance from a flow controller to a plurality of irrigation tubes extended from the tubular legs to a plurality of plant pots on at least one surface of the table and on one or more optional rack structures extended from the tubular legs and-or extended from portions of the table. The flow controller can have select levels of timed intermittence and/or controlled levels of steady flow of water with optional fertilizer and straining. Controllable-flow drippers on pot ends of the irrigation tubes control flow to separate plant pots within ranges of flow from the flow controller.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are described briefly as follows:

FIG. 1 is a perspective front view of a rectangularly polygonal plant irrigation table with watertight rigid tubes;

FIG. 2 is a partially cutaway side view of a portion of a rigid tube with a hose-connection outlet;

FIG. 3 is a perspective view of a plant pot in relation to a dripper and an irrigation hose;

DESCRIPTION OF PREFERRED EMBODIMENT

Figure 4:
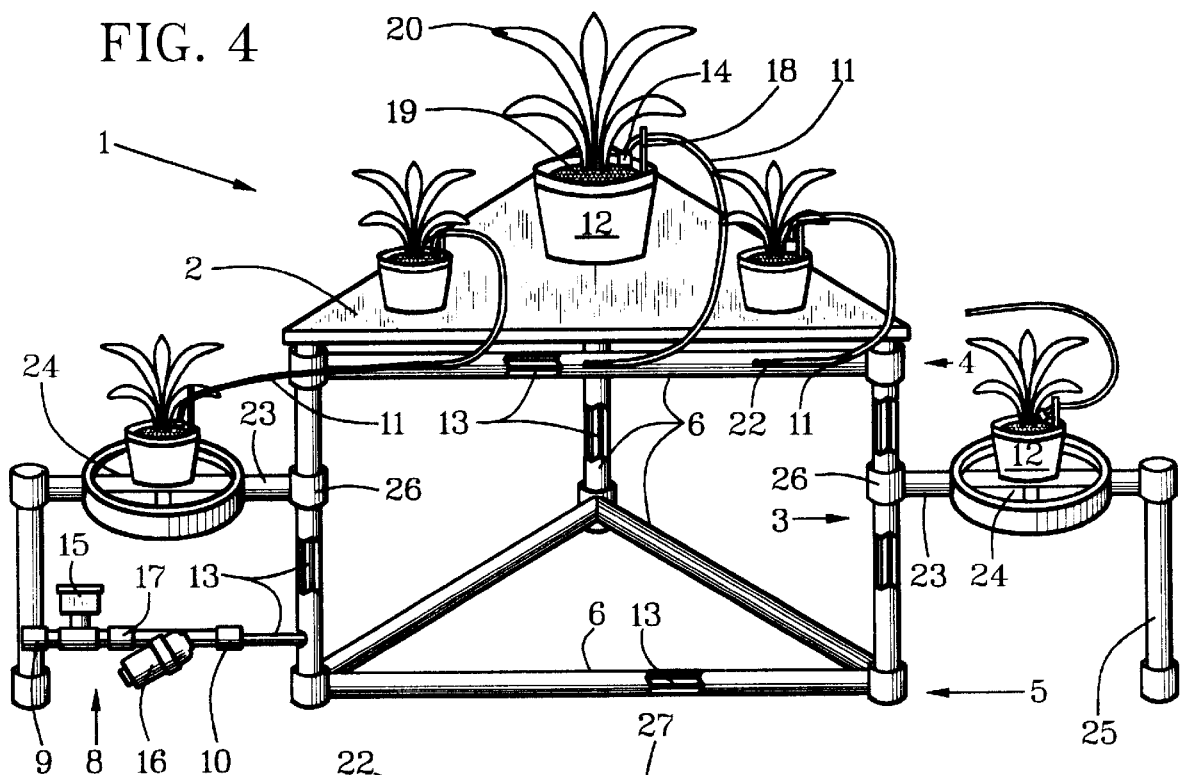
FIG. 4 is a perspective front view of a triangularly polygonal plant irrigation table with a frame sleeve.

Terms used to describe features of this invention are listed below with numbering in the order of their initial use with reference to the drawings. These terms and numbers assigned to them designate the same features wherever used throughout this description.

1. Table
2. Table surface
3. Tubular legs
4. Top tubular frame
5. Bottom tubular frame
6. Rigid tubes
7. Inside periphery
8. Flow controller
9. Source end
10. Tube end
11. Irrigation hose
12. Plant pot
13. Frame sleeve
14. Dripper
15. Control unit
16. Fertilizer unit
17. Back-flow preventer
18. Dripper stake
19. Soil
20. Plant
21. Hose-connection outlet
22. Hose connector
23. Rack arm
24. Rack-table surface 25. Rack-arm leg
26. Slip-fit attachment sleeve
27. Rigid-tube access Reference is made first to FIGS. 1–3. A table 1 with a table surface 2 has tubular legs 3, a top tubular frame 4 and/or a bottom tubular frame 5 with rigid tubes 6, preferably made of PVC, that are joined with inside peripheries 7 being in communication. A flow controller 8 has a source end 9 that is fluid communicative with a water source that is not shown and a tube end 10 that is fluid communicative with at least one of the rigid tubes 6. At least one irrigation hose 11 is in fluid communication from at least one of the rigid tubes 6 to at least one plant pot 12 on the at least one table surface 2. The rigid tubes 6 have water conveyance from the flow controller 8 directly or through a frame sleeve 13 shown in FIGS. 4–6 for conveyance of water for irrigation from the flow controller 8 to a dripper 14 on a pot end of the irrigation hose 11.

Referring to FIGS. 1 and 4, the flow controller 8 has a control unit 15 with which it is controllable for intermittent flow and/or for rate of flow. The flow controller 8 also can have a fertilizer unit 16 for adding fertilizer to flow of water and a back-flow preventer 17 for preventing reverse flow of water and/or fertilizer through the flow controller 8. Additionally, the flow controller 8 can have a fluid strainer for removal of water contaminants. The flow controller 8 also can be structured to regulate fluid pressure.

The table 1 and table surface 2 can be either round or polygonal but are preferably either rectangularly polygonal as depicted in FIG. 1 or triangularly polygonal as depicted in FIG. 4. The triangularly polygonal table 1 is primarily for use in corners of rooms.

Referring to FIGS. 1, 3 and 4, the irrigation hose 11 can be positioned on a dripper stake 18 proximate the dripper 14 to keep it from falling out and to support the dripper 14 vertically above soil 19 in the plant pots 12 for irrigating some types of plants 20, some types of soil 19 and some stages of growth of plants 20.

For rigid tubes 6 in which water is conveyed directly as described in relation to FIGS. 1–2, the rigid tubes 6 have at least one hose-connection outlet 21 for connection to at least one irrigation hose 11 in fluid communication to the at least one plant pot 12 and remaining portions of the rigid tubes 6 are watertight for conveyance of water from the flow controller 8 through the rigid tubes 6 and through the at least one irrigation hose 11 en route to the at least one plant pot 12.

Figure 5:
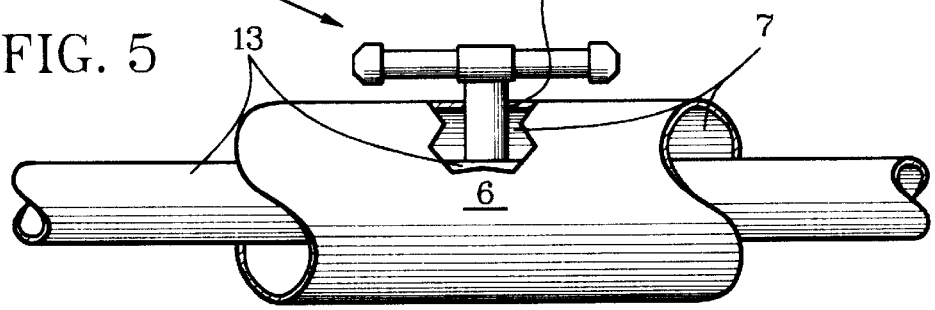
FIG. 5 is a partially cutaway side view of a portion of a rigid tube with a multiple hose connector.
Figure 6:
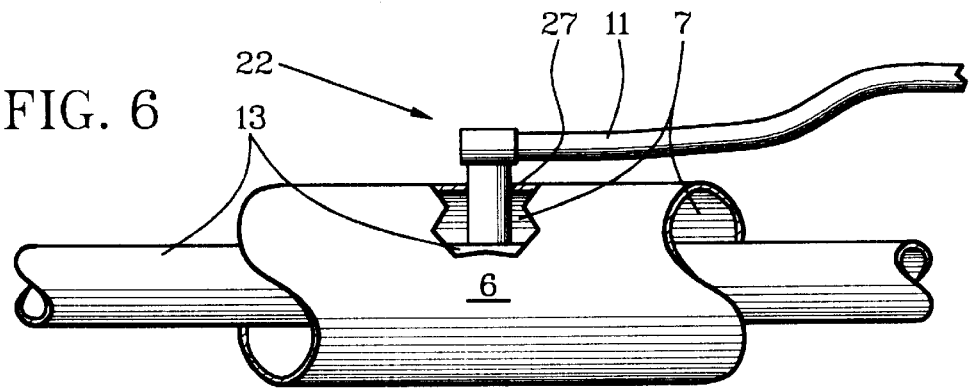
FIG. 6 is a partially cutaway side view of a portion of a rigid tube with a singular hose connector.

As depicted in FIGS. 4–6 for rigid tubes 6 in which water is conveyed in a frame sleeve 13 in the rigid tubes 6, the frame sleeve 13 has at least one hose connector 22 for connection of the frame sleeve 13 to at least one irrigation hose 11. The hose connector 22 can have a multiple connection as shown in FIG. 5 or a single connection as shown in FIG. 6. The hose-connection outlet 21 can be either singular or plural as shown for the hose connector 22 although only a multiple connection is shown. The hose-connection outlet 21 is in fluid communication with the inside periphery 7 of the rigid tubes 6 and the hose connector 22 is in fluid communication with the frame sleeve 13. The hose-connection outlet 21 and hose connector 22, being similar in function and construction, can be made to appear the same as depicted in FIG. 1 for hose-connection outlets 21 and in FIG. 3 for hose connectors 22.

The drippers 14, described in relation to FIGS. 1, 3 and 4, can be adjusted for typically zero-to-ten gallons of flow per minute in combination with and/or independently of adjustment of rate of flow and adjustment of intermittence of flow by the flow controller 8 that are described also in relation to FIGS. 1, 3 and 4. This allows a wide selection of flow control for drip irrigation with this potted-plant-irrigator table. A wide selection of flow control by the flow controller 8 can obviate need for the dripper 14 for some applications. Also, a wide selection of flow control by the dripper 14 can obviate need for the flow controller 8 for some applications. For precise, dependable, highly versatile and care-free plant-pot irrigation and fertilizer objectives of this invention, however, the dripper and the flow controller are essential parts of this potted-plant-irrigator table.

Referring to FIGS. 1 and 4, at least one rack arm 23 having a rack-table surface 24 can be attachable selectively to the rigid tubes 6 from which it can be extendible radially in at least one desired direction and at a desired height from the rigid tubes 6. Optionally, the rack arms 23 and the rack-table surfaces 24 can have rack-arm legs 25 as depicted in FIG. 4 for a selection of table surfaces. Slip-fit attachment sleeves 26 can be employed for attachment of the rack arms 23 to the rigid tubes 6. A selection of well-known fasteners such as wing nuts and set screws that are not shown can be used to maintain the slip-fit attachment sleeves 26 in position. The rigid tubes 6 have at least one rigid-tube access 27 through which the frame sleeve 13 can be accessed.

A new and useful plant-irrigator table having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A potted-plant-irrigator table comprising:
   at least one table surface on a table having tubular legs and a tubular frame with rigid tubes that are joined with inside peripheries being in communication;
   a flow controller having a source end that is fluid communicative with a water source and having a tube end that is fluid communicative with at least one of the rigid tubes;
   at least one irrigation hose in fluid communication from at least one of the rigid tubes to at least one plant pot on the at least one table surface;
   the rigid tubes having water conveyance from the flow controller to the at least one irrigation hose; and
   a dripper on a pot end of the at least one irrigation hose.

2. A potted-plant-irrigator table as described in claim 1 wherein:
   the flow controller is time-interval regulatory for intermittent flow of fluid to the dripper.

3. A potted-plant-irrigator table as described in claim 2 wherein:
   the flow controller is flow-rate regulatory for control of rate of flow in addition to time-interval regulation of flow of fluid to the dripper.

4. A potted-plant-irrigator table as described in claim 1 wherein:
   the flow controller is flow-rate regulatory for control of rate of flow of fluid independently of time-interval regulation of flow of fluid to the dripper.

5. A potted-plant-irrigator table as described in claim 1 wherein:
   the dripper on the pot end of the at least one irrigation hose is flow-rate controllable for control of flow rate from at least one of a plurality of drippers on a pot end of the at least one irrigation hose.

6. A potted-plant-irrigator table as described in claim 5 wherein:

the flow controller is flow-rate regulatory for control of rate of flow through the flow controller in addition to control of flow rate from the at least one of a plurality of drippers on a pot end of the at least one irrigation hose.

7. A potted-plant-irrigator table as described in claim 5 wherein:

the flow controller is time-interval regulatory for intermittent flow of fluid in addition to control of flow rate from the at least one of a plurality of drippers on a pot end of the at least one irrigation hose.

8. A potted-plant-irrigator table as described in claim 7 wherein:

the flow controller is flow-rate regulatory for control of rate of flow in addition to control of flow rate from the at least one of a plurality of drippers on a pot end of the at least one irrigation hose and in addition to time-interval regulation for intermittent flow of fluid to the rigid tubes.

9. A potted-plant-irrigator table as described in claim 1 and further comprising:

a fertilizer unit in the flow controller for adding fertilizer to flow of water.

10. A potted-plant-irrigator table as described in claim 1 and further comprising:

a back-flow preventer proximate the flow controller for preventing reverse flow of water through the flow controller.

11. A potted-plant-irrigator table as described in claim 1 and further comprising:

at least one dripper stake on which an irrigation hose proximate a dripper is positioned in at least one plant pot.

12. A potted-plant-irrigator table as described in claim 1 wherein:

the table surface is polygonal with one leg for each of three or more corners of the table surface for a plurality of three or more tubular legs of the potted-plant-irrigator table;

the three or more tubular legs are attached to a top polygonal tubular frame of rigid tubes proximate a top of the plurality of three or more tubular legs; and the three or more tubular legs are attached to a bottom polygonal tubular frame of rigid tubes proximate a bottom of the plurality of three or more tubular legs.

13. A potted-plant-irrigator table as described in claim 1 and further comprising:

at least one rack arm attachable selectively to the rigid tubes and having a rack-table surface on which the at least one plant pot can be positioned in addition to at least one plant pot being positioned on the table surface.

14. A potted-plant-irrigator table as described in claim 13 wherein:

the at least one rack arm is extendible radially in at least one desired direction from and at a desired height from the rigid tubes selectively.

15. A potted-plant-irrigator table as described in claim 1 wherein:

the flow controller has an outlet end in fluid communication with an inside periphery of a predetermined portion of the rigid tubes;

the rigid tubes have at least one hose-connection outlet for connection to at least one irrigation hose in fluid communication to the at least one plant pot; and remaining portions of the rigid tubes are watertight for conveyance of water from the flow controller through the rigid tubes and through the at least one irrigation hose en route to the at least one plant pot.

16. A potted-plant-irrigator table as described in claim 1 wherein:

the outlet end of the flow controller is in fluid communication with an inside periphery of at least one frame sleeve positioned inside of a predetermined portion of the rigid tubes;

the frame sleeve has at least one hose connector for connection of the frame sleeve to at least one irrigation hose for fluid communication to the at least one plant pot; and the rigid tubes have at least one rigid-tube access through which the frame sleeve is accessed for fluid-conveyance connection of the at least one irrigation hose to the frame sleeve for conveyance of water from the flow controller through the rigid tubes and through the at least one irrigation hose en route to the at least one plant pot.

17. A potted-plant-irrigator table comprising:

a polygonal table having at least one polygonal table surface with at least three tubular legs and a correspondingly polygonal frame made of rigid tubes having fluid communication from a flow controller to at least one irrigation hose with fluid communication through the rigid tubes en route to at least one plant pot on the at least one polygonal table surface;

a dripper on a pot end of the at least one irrigation hose;

the dripper on the pot end of the irrigation hose being flow-rate controllable for control of flow rate of water and optionally fertilizer from the dripper;

at least one rack arm attachable to at least one of the rigid tubes and having at least one rack table with at least one rack-table surface on which plant pots can be positioned in addition to being positioned on the at least one polygonal table surface; and the at least one rack arm is extendible radially in at least one desired direction from at least one desired portion of the rigid tubes selectively.

18. A potted-plant-irrigator table as described in claim 17 wherein:

the flow controller is flow-rate regulatory for control of rate of flow through the flow controller in addition to control of flow rate from the at least one dripper on a pot end of the at least one irrigation hose.

19. A potted-plant-irrigator table as described in claim 17 wherein:

the flow controller is time-interval regulatory for intermittent flow of fluid through the rigid tubes in addition to control of flow rate from the at least one dripper on the pot end of the at least one irrigation hose.

20. A potted-plant-irrigator table as described in claim 19 wherein:

the flow controller is flow-rate regulatory for control of rate of flow through the flow controller in addition to control of flow rate from the at least one of a plurality of drippers on the pot end of the at least one irrigation hose and in addition to time-interval regulation for intermittent flow of fluid through the rigid tubes.

* * * * *